(12) United States Patent
Klingbeil

(10) Patent No.: US 11,236,685 B2
(45) Date of Patent: Feb. 1, 2022

(54) DIFFERENTIAL CYLINDER BALANCING FOR INTERNAL COMBUSTION ENGINE

(71) Applicant: Transportation IP Holdings, LLC, Norwalk, CT (US)

(72) Inventor: Adam Edgar Klingbeil, Ballston Lake, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 76 days.

(21) Appl. No.: 16/565,325

(22) Filed: Sep. 9, 2019

(65) Prior Publication Data

US 2020/0003131 A1 Jan. 2, 2020

Related U.S. Application Data

(63) Continuation-in-part of application No. 15/282,094, filed on Sep. 30, 2016, now Pat. No. 10,408,158.

(51) Int. Cl.
*F02D 19/06* (2006.01)
*F02P 5/145* (2006.01)

(52) U.S. Cl.
CPC ......... *F02D 19/0613* (2013.01); *F02D 19/06* (2013.01); *F02P 5/145* (2013.01)

(58) Field of Classification Search
CPC .. F02D 19/0613; F02D 19/06; F02D 41/0085; F02D 41/0025; F02D 37/02; F02D 41/222; F02D 35/023; F02D 41/1498; F02D 35/027; F02D 41/1443; F02D 41/1446; F02D 41/0027; F02D 19/10; F02P 5/145; F02P 5/1512; F02P 5/045; Y02T 10/30; Y02T 10/40

See application file for complete search history.

(56) References Cited

U.S. PATENT DOCUMENTS

| | | | |
|---|---|---|---|
| 4,641,625 A | 2/1987 | Smith | |
| 5,355,854 A | 10/1994 | Aubee | |
| 5,370,097 A | 12/1994 | Davis | |
| 5,541,840 A | 7/1996 | Gume et al. | |
| 6,000,384 A * | 12/1999 | Brown | F02D 41/0027 123/676 |
| 6,003,478 A | 12/1999 | Huber | |
| 6,101,986 A * | 8/2000 | Brown | F02D 33/00 123/27 GE |

(Continued)

FOREIGN PATENT DOCUMENTS

| | | |
|---|---|---|
| JP | H10110640 A | 4/1998 |
| JP | 4616851 B2 | 10/2010 |

*Primary Examiner* — Phutthiwat Wongwian
*Assistant Examiner* — Susan E Scharpf
(74) *Attorney, Agent, or Firm* — McCoy Russell LLP

(57) ABSTRACT

A method of adjusting operation of an internal combustion engine includes injecting fuel into cylinders of the internal combustion engine (first fuel operation); obtaining a first fuel exhaust temperature profile during the first fuel operation; injecting two fuels into the cylinders in a duel fuel operation; obtaining a duel fuel exhaust temperature profile; and adjusting the injection quantity and/or an injection timing of one fuel in a cylinder(s), based on a difference between the first fuel exhaust temperature profile and the duel fuel exhaust temperature profile. Other methods of operating with single fuel and using sensors other than exhaust temperature sensors are disclosed.

20 Claims, 5 Drawing Sheets

(56) References Cited

U.S. PATENT DOCUMENTS

| | | | |
|---|---|---|---|
| 6,158,418 A * | 12/2000 | Brown | F02D 41/0027 |
| | | | 123/435 |
| 6,230,683 B1 | 5/2001 | zur Loye et al. | |
| 6,250,260 B1 | 6/2001 | Green | |
| 6,276,334 B1 | 8/2001 | Flynn et al. | |
| 6,286,482 B1 | 9/2001 | Flynn et al. | |
| 6,289,871 B1 | 9/2001 | Brown et al. | |
| 6,543,395 B2 | 4/2003 | Green | |
| 6,981,488 B2 * | 1/2006 | Harris | F02D 35/023 |
| | | | 123/435 |
| 7,591,258 B2 * | 9/2009 | Nagel | F02D 41/008 |
| | | | 123/456 |
| 7,751,955 B2 * | 7/2010 | Chinnadurai | G05B 23/0235 |
| | | | 701/29.3 |
| 7,957,889 B2 * | 6/2011 | Portin | F02D 19/024 |
| | | | 701/104 |
| 8,826,884 B2 | 9/2014 | Kang et al. | |
| 2002/0007816 A1 * | 1/2002 | Zur Loye | F02D 41/403 |
| | | | 123/295 |
| 2015/0233282 A1 * | 8/2015 | Bandyopadhyay | F02D 19/0647 |
| | | | 60/603 |
| 2018/0094600 A1 * | 4/2018 | Klingbeil | F02D 41/402 |

* cited by examiner

DIFFERENTIAL CYLINDER BALANCING FOR INTERNAL COMBUSTION ENGINE

CROSS REFERENCE TO RELATED APPLICATIONS

The present application is a continuation-in-part of U.S. patent application Ser. No. 15/282,094 titled "DIFFERENTIAL CYLINDER BALANCING FOR INTERNAL COMBUSTION ENGINE" filed on Sep. 30, 2016. The entire contents of the above-listed application are hereby incorporated by reference for all purposes.

BACKGROUND

The present application relates generally to internal combustion engines and more particularly to improved methods of cylinder balancing in an internal combustion engine.

Variation of operation parameters of cylinders in multi-cylinder engines can lead to an imbalance of power in cylinders. Variation from cylinder-to-cylinder of fuel quantity delivery may cause one, or more, cylinders to approach the knock limits of the fuel-air mixture, which ultimately can lead to performance degradation of the engine. Further, unbalanced engines may apply greater forces to engine components compared to balanced engines. These greater forces may produce premature wear and decreased reliability.

Spark-ignited and dual fuel internal combustion engines commonly balance cylinders via a controller collecting the measuring of the exhaust temperature of each cylinder and then adjusting an engine parameter, typically fuel quantity, spark timing or injection timing, in order to rebalance the cylinders so that the resultant cylinder exhaust temperatures more closely match each other. While this is a plausible methodology, cylinder-to-cylinder exhaust temperatures are not necessarily indicative of cylinder condition and may provide an inaccurate indication of actual cylinder conditions due to variations in (but not limited to): sensor response, sensor mounting, cylinder breathing, and the like.

Accordingly, there is an ongoing need for improving internal combustion engine operation through improved cylinder balancing.

BRIEF DESCRIPTION

The present application overcomes at least some of the aforementioned drawbacks by providing an improved cylinder balancing methodology for operating an internal combustion engine. More specifically, the present application includes a method of cylinder balancing that more accurately accounts for actual cylinder-to-cylinder variations in operating a multi-cylinder internal combustion engine such as a dual fuel engine by considering an engine cylinder parameter, such as cylinder exhaust temperature, in a more accurate way.

Therefore, in accordance with one aspect of the application, a method of adjusting operation of an internal combustion engine, the method comprises: injecting a first fuel into a plurality of cylinders of the internal combustion engine, thereby defining a first fuel operation; obtaining a first fuel exhaust temperature profile, during the first fuel operation; injecting a second fuel and the first fuel into the plurality of cylinders of the internal combustion engine, thereby defining a duel fuel operation; obtaining a duel fuel exhaust temperature profile, during the duel fuel operation; and adjusting one of an injection quantity and an injection timing of one of the first fuel and the second fuel in at least one of the plurality of cylinders, based on a difference between the first fuel exhaust temperature profile and the duel fuel exhaust temperature profile.

In accordance with another aspect of the application, a method of adjusting operating an internal combustion engine comprises: injecting a fuel into a plurality of cylinders of an internal combustion engine, defining a baseline operation; obtaining a baseline exhaust temperature profile, during the baseline operation; injecting the fuel into the plurality of cylinders; obtaining a second exhaust temperature profile; and adjusting one of an injection quantity and a spark timing of the fuel in at least one of the plurality of cylinders, based on a difference between the baseline exhaust temperature profile and the second exhaust temperature profile.

In accordance with another aspect of the application, a method of adjusting operation of an internal combustion engine, the method comprises: injecting a first fuel into a plurality of cylinders of the internal combustion engine, thereby defining a first fuel operation; obtaining a first fuel engine operating profile, during the first fuel operation; injecting a second fuel and the first fuel into the plurality of cylinders of the internal combustion engine, thereby defining a duel fuel operation; obtaining a duel fuel engine operating profile, during the duel fuel operation; and adjusting one of an injection quantity and an injection timing of one of the first fuel and the second fuel in at least one of the plurality of cylinders, based on a difference between the first fuel engine operating profile and the duel fuel engine operating profile.

In accordance with another aspect of the application, a method of operating an internal combustion engine comprises: injecting a fuel into a plurality of cylinders of an internal combustion engine, defining a baseline operation; obtaining a baseline engine operating profile, during the baseline operation; injecting the fuel into the plurality of cylinders defining an operating condition other than the baseline operating condition; obtaining a second engine operating profile; and adjusting one of an injection quantity and a spark timing of the fuel in at least one of the plurality of cylinders, based on a difference between the baseline engine operating profile and the second engine operating profile.

Various other features and advantages of the present application will be made apparent from the following detailed description and the drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The drawings illustrate one embodiment presently contemplated for carrying out the application.

DETAILED DESCRIPTION

Aspects of the present application have been shown to offer advantages over previous methodologies of cylinder balancing of multi-cylinder engine. In an embodiment, the method more closely matches the dual fuel exhaust temperature distribution to the diesel-only exhaust temperature distribution. In this manner, a more desirable fueling profile and the concomitant more balanced power profile can be achieved. Ultimately, the operation of the engine is improved.

The term "exhaust temperature profile" as used herein includes one or more individual exhaust temperatures measured at one or more cylinders and an average, or mean, of two or more exhaust temperatures. Each individual exhaust temperature will bear a relationship to the mean which can be represented by a difference. The means, individual exhaust temperatures, differences between individual exhaust temperatures and a mean, and other parameters form an exhaust temperature profile. Individual exhaust temperatures can be an exhaust temperature from an individual cylinder or a group of cylinders.

Figure 3:
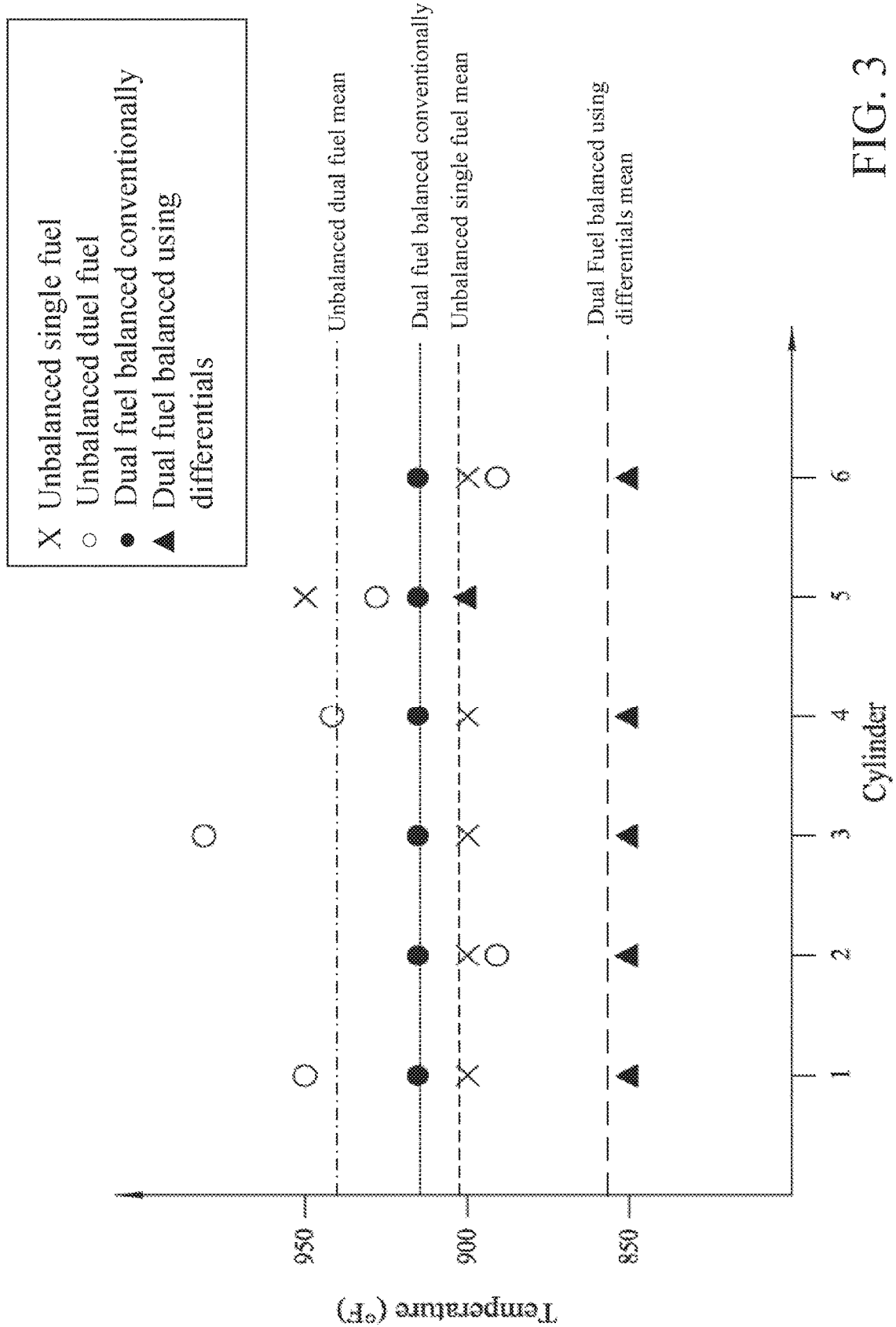
FIG. 3 is an X-Y graph depicting cylinder-by-cylinder variation of exhaust temperature (° F.) according to an embodiment of the present application.
Figure 4:
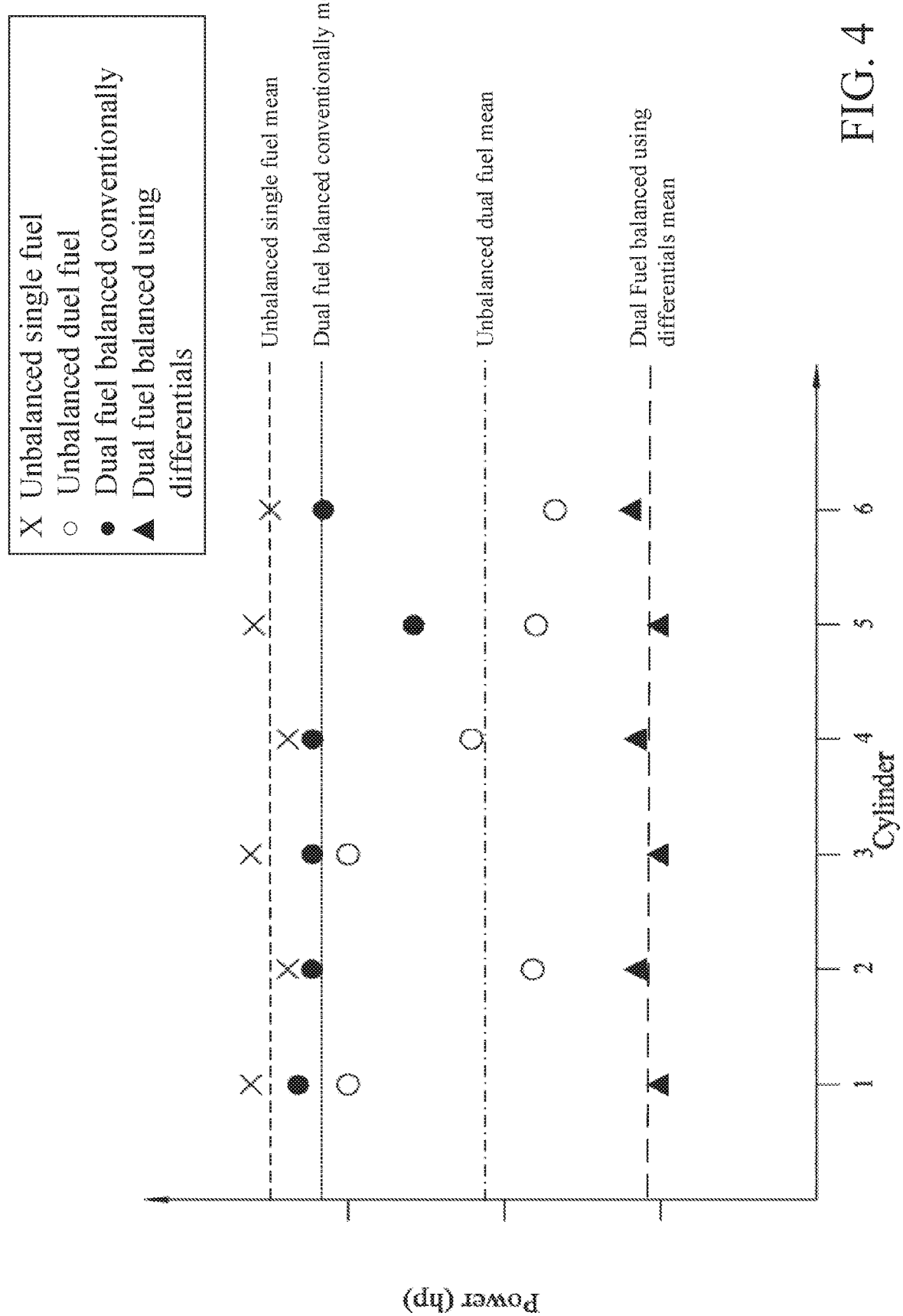
FIG. 4 is an X-Y graph depicting cylinder-by-cylinder variation of power (hp) according to an embodiment of the present application.

Exhaust temperature profiles can be used to compare different engine operations. For example, FIGS. 3 and 4 depict exhaust temperature profiles that vary based on balancing and fueling.

Exhaust temperatures are measured from the internal combustion engine, whether at a plurality of individual cylinders; individual cylinders exhaust passages; at a common exhaust plenum; or, some combination thereof.

The term "engine operating profile" as used herein means the enumerated differences between a measured engine operating parameter at one (or more) cylinder and an average, or mean, of two or more engine operating parameters measured from the internal combustion engine, whether at a plurality of individual cylinders; at a common location and one or more cylinders; or, some combination thereof. The engine operating parameters include, but are not limited to, exhaust temperature, vibration, strain, gas pressure, and the like.

Figure 1:
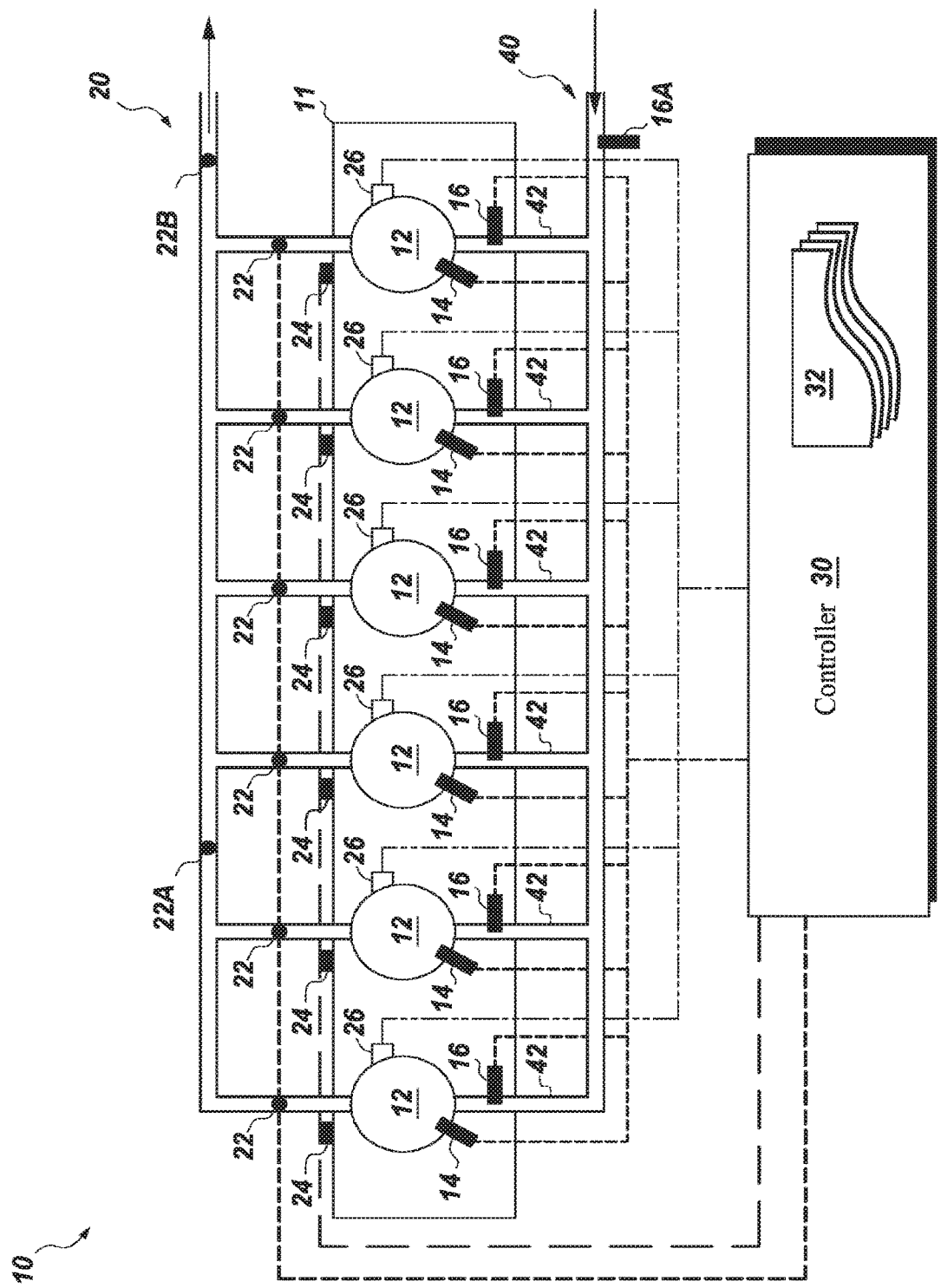
FIG. 1 is a schematic diagram of a multi-cylinder internal combustion engine incorporating aspects of the present application.

Referring to FIG. 1, a schematic view of a portion of an exemplary multi-cylinder internal combustion engine 10 that can incorporate aspects of the present application is shown. Salient aspects of the engine 10 are shown. The multi-cylinder internal combustion engine, or engine, 10 may comprise a plurality of cylinders 12. The engine 10 has a duel fuel configuration such that it is configured to run on more than one fuel, such as diesel and natural gas. Other fuels may be used in certain embodiments. Similarly, the engine 10 may be configured to also run on a single fuel.

As shown, the engine 10 having multiple cylinders 12 also comprises a plurality of fuel injectors 14, 16 for each cylinder 12. As is typical for a duel fuel engine 10, each type of fuel may have its own set of fuel injectors. So too here, a first set of fuel injectors 14 provide to each cylinder 12 a first fuel (e.g., diesel). A second set of fuel injectors 16 provide to each cylinder 12 a second fuel (e.g., natural gas).

The engine 10 has an intake manifold 40 configured to deliver air to each of the cylinders 12 via intake ports 42. As shown, each intake port, or plenum 42 for each cylinder 12 may have an associated fuel injector 16 for delivering, or injecting, the second fuel into the cylinder 12.

Although the embodiment shown in FIG. 1 discloses a specific configuration of fuel injectors, other configurations are possible under embodiments of the application. For example, the locations of the fuel injectors 14, 16 shown are merely schematic. The fuel injectors 14, 16 could be located in other locations. For example, both fuel injectors 14, 16 can be located in the combustion chamber in an embodiment. Similarly, in single fuel embodiments the fuel injectors may be located in the combustion chamber, the intake port, or plenum, and the like. For example, in an embodiment the fuel injector 16A may be located upstream in the intake plenum and/or at a carburetor in the intake system 40. Similarly, in an embodiment, instead of a two injector (e.g., 14, 16) configuration, there is a spark igniter at the cylinder and a single point (or more) injector 16A that is in the intake system 40. This configuration can be used, for example, when natural gas is used as the single fuel.

The engine 10 has an exhaust system 20 that comprises a plurality exhaust ports, or plenums, that typically manifold together the exhaust gasses from the respective cylinders 12. Each cylinder 12 has an exhaust temperature sensor 22. The exact location and mounting configuration of the exhaust temperature sensor 22 may vary depending on the type of sensor used, the type of engine, the mounting configuration, and the like.

Although the embodiment shown in FIG. 1 discloses a specific configuration of exhaust temperature sensors 22, other configurations are possible under embodiments of the application. For example, the locations of the exhaust temperature sensors 22 shown are merely schematic. Additionally, in addition to and/or in lieu of the locating of exhaust temperature sensors 22 along the individual cylinder exhaust ports or plenums, an exhaust temperature sensor(s) may be located on the exhaust manifold/plenum (see e.g., 22B). Similarly, in other embodiments, there may be a fewer quantity of exhaust temperature sensors 22 than the quantity of cylinders 12. For example, an individual exhaust temperature sensor may be sharing two (or more) cylinders in measuring exhaust temperature (See e.g., 22A). For example, in a V-configured engine there may be a single exhaust temperature sensor that measures exhaust temperature from opposing cylinders from opposing cylinder banks.

The engine 10 may also have knock sensors 24, pressure sensors 26, and stress/strain gage associated with each of the cylinders 12. As shown in FIG. 1, each knock sensor 24 may be attached to the engine block 11 adjacent to a respective cylinder 12. The knock sensor 24 is configured to measure vibration. Similarly, each pressure sensors 26 may be in fluid communication with a respective cylinder 12. The pressure sensor 26 is configured to measure gas pressure in the cylinder 12 chamber. Similarly, each stress/strain gage may be suitably located so as to measure strain.

Knock sensors, pressure sensors, strain gages, oxygen sensors as well as feedback from components such as fuel pumps may be used to create engine operating profiles. These engine operating profiles may be used in addition to and/or in lieu of exhaust temperature sensors in the balancing of the cylinders. For example, the other sensor(s) (e.g., 24, 26, etc.) can be used to obtain engine operating profiles of the cylinders other than the exhaust temperature profiles. The various methods herein can optionally use the engine operating profiles in determining cylinder and engine operating conditions. It should be apparent that this balancing technique can be applied to balance the cylinders using other sensors besides exhaust temperature, knock, pressure or strain sensors.

The engine 10 comprises a controller 30 that is in communication with the fuel system, the plurality of fuel injectors 14, 16 and temperature sensors 22. The controller 30 may also be in communication with the knock sensors 24, pressure sensors 26, and stress/strain gages. The controller 30 may store one, or more, exhaust temperature profiles 32 therein. The controller 30 may also store one, or more, of the other operating profiles therein. Alternatively, exhaust temperature profile(s) 32 and the other engine operating profiles may be stored remotely from engine 10 (e.g., internet, cloud, remote storage, etc.). The controller 30 may include a processor and memory storing instructions for controlling the engine, receiving and processing input from sensors, calculating a mean exhaust temperature and calculating differentials between an individual cylinder exhaust temperature and a mean exhaust temperature.

Figure 2:
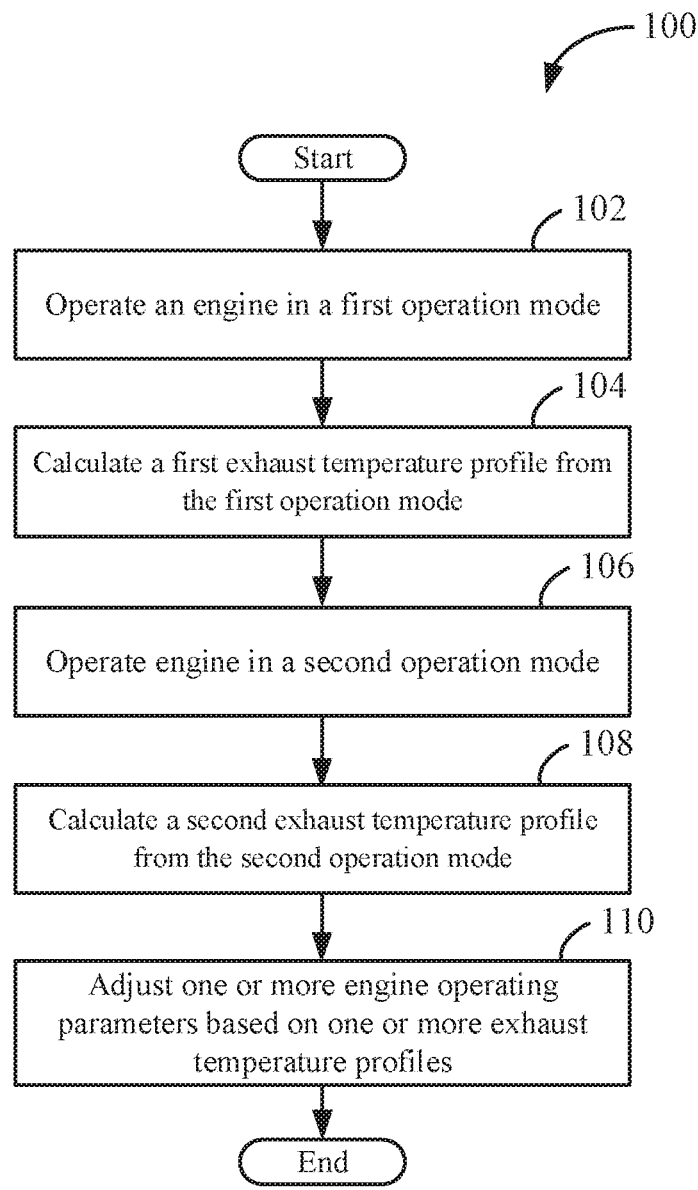
FIG. 2 is a flowchart depicting a method of adjusting operation of an internal combustion engine, according to an embodiment of the present application.

Referring to FIG. 2, a flowchart of a method of operating the engine 10 is depicted. As shown, a method 100 may comprise injecting a first fuel into a plurality of cylinders of the internal combustion engine in a first fuel operation at 102. At 104, the method 100 continues with calculating a first fuel exhaust temperature profile, during the first fuel operation. In one embodiment, the first fuel exhaust temperature profile includes each individual cylinder exhaust temperature, a mean of the exhaust temperatures, and a differential between each individual cylinder exhaust temperature and the mean. Other embodiments may use individual exhaust temperatures from two cylinders in a group or a cylinder bank. Other information may be included in the exhaust temperature profile such as a proportional differential of individual exhaust temperatures from the mean.

At 106, the method 100 injects the second fuel and the first fuel into the cylinders of the engine 10 in a dual fuel operation. The method 100 then obtains a dual fuel exhaust temperature profile during the dual fuel operation at 108. In one embodiment, the dual fuel exhaust temperature profile includes each individual cylinder exhaust temperature, a mean of the exhaust temperatures, and a differential of each individual cylinder exhaust temperature from the mean. Other embodiments may include different configurations such as those discussed in regards to step 104.

At 110, the method 100 adjusts one or more engine parameters in one or more operation modes based on one or more of the exhaust temperature profiles. The adjusted engine parameters may include one or more of the fuel injection quantity, injection timing of a fuel mode, and spark timing of a fuel mode. In one example, an engine operating parameter of an unbalanced dual fuel mode is adjusted based on the difference between the exhaust temperature profile of the dual fuel mode and the exhaust temperature profile of an unbalanced single fuel operation mode. As will be shown in FIGS. 3 and 4, this method may produce a dual fuel exhaust temperature profile similar to a single fuel exhaust temperature profile and more uniform power in each cylinder of a dual fuel operation. In other examples, adjustment of an engine operating parameter could be based on two or more exhaust temperature profiles. In still further examples, two or more engine operating parameters may be adjusted.

An embodiment of a method of operating the engine comprises collecting an exhaust temperature from each cylinder (T_Cyl). An exhaust temperature profile may then be calculated. In one embodiment, a first exhaust temperature profile is collected while using only diesel fuel. A mean or average calculation is shown in Equation 1:

$$T_{avg} = \text{average}(T\_Cyl) \quad \text{(Eq. 1)}$$

A differential between an individual cylinder temperatures $T\_Cyl_x$ and the mean or average $T\_avg$ can then be calculated. The individual temperature differential, $\Delta T_x$, is shown in Equation 2:

$$\Delta T_x = T\_Cyl_x - T\_avg \quad \text{(Eq. 2)}$$

Equations 1 and 2 can be used to calculate a mean or average and differential for several types of fueling. In one example, exhaust temperature profiles are calculated for a diesel only fueling and a fueling using two fuels such as diesel and natural gas. Therefore, the calculations would produce $T\_Cyl_{x\_diesel}$, $T\_avg_{diesel}$, $\Delta T_{x\_diesel}$, $T\_Cyl_{x\_dual}$, $T\_avg_{dual}$, and $\Delta T_{x\_dual}$. Other embodiments may calculate exhaust temperature profiles for two or more types of fueling, for example, diesel only, natural gas only, and dual fueling. Further embodiments may calculate further information for each type of fueling.

Exhaust temperatures may not be balanced across all cylinders. As will be seen in FIG. 3, different types of fueling will produce different exhaust temperature profiles. These profiles can then be used to balance an engine operation in a multitude of ways. In one embodiment, once the cylinders are balanced, individual temperature differentials $\Delta T_x$ of a duel fuel mode will be similar to those of a single fuel mode. In other words, individual cylinder temperatures will have similar differences from a mean during duel fueling and single fueling. For example, individual cylinder temperatures may have similar differences from a mean when using only diesel and when using diesel and natural gas.

As used herein, a single fuel mode describes using one type of fuel, such as diesel, natural gas, liquid gas, to operate an engine. A dual fuel mode describes using two types of fuel to operate the engine.

FIG. 3 and FIG. 4 depict X-Y graphs of the cylinder-by-cylinder variation of exhaust temperature (° F.) and power (hp), respectively. FIGS. 3 and 4 show exhaust temperature profiles and horsepower for several types of fueling and balancing to illustrate how engine operation may be adjusted. The y-axis is the exhaust temperature (° F.) in FIG. 3; and, resultant power (hp) in FIG. 4. The x-axis the respective cylinder in both figures (in this embodiment: a six-cylinder engine).

Referring to the legend in FIG. 3, the symbol, X, signifies individual cylinder exhaust temperatures of the engine in a first operation mode. FIGS. 3 and 4 depict a first operation mode as using diesel fuel only and without balancing applied to the engine. The symbol, ○, signifies individual cylinder exhaust temperatures of the engine running in a second operation mode. FIGS. 3 and 4 depict a second operation mode as using two fuels without balancing applied. The symbol, ●, signifies individual cylinder exhaust temperatures in a third operation mode. FIGS. 3 and 4 depict a third operation mode as using two fuels with a balancing applied that adjusts engine operation such that all exhaust temperature are equal, according to conventional methods. The symbol, ▲, signifies individual cylinder exhaust temperatures in a fourth operation mode. FIGS. 3 and 4 depict a fourth operation mode using two fuels with a balancing applied that adjusts engine operating parameters such that the individual temperature differentials relative to mean are similar or approximately the same as the individual temperature differentials relative to mean when operating in the first operation mode. In other words, engine operating parameters may be adjusted such that differences between individual cylinder exhaust temperatures and a mean temperature are approximately the same between multiple operating modes.

Similarly, the legend in FIG. 4 uses the same symbols, but instead showing the power output of each cylinder. The symbol, X, signifies individual cylinder power of the engine in a first operation mode. FIGS. 3 and 4 depict a first operation mode as using diesel fuel only and without balancing applied to the engine. The symbol, ○, signifies individual cylinder power of the engine running in a second operation mode. FIGS. 3 and 4 depict a second operation mode as using two fuels without balancing applied. The symbol, ●, signifies individual cylinder power in a third operation mode. FIGS. 3 and 4 depict a third operation mode as using two fuels with a balancing applied that adjusts engine operation such that all exhaust temperatures are equal, according to conventional methods. The symbol, ▲, signifies individual cylinder power in a fourth operation mode. FIGS. 3 and 4 depict a fourth operation mode using two fuels with a balancing applied that adjusts engine operating parameters such that the individual temperature differentials relative to mean are similar or the same as the individual temperature differentials relative to mean when operating in the first operation mode of using diesel fuel only and without balancing applied. In other words, engine operating parameters may be adjusted such that differences between individual cylinder exhaust temperatures and a mean temperature are approximately the same between multiple operating modes.

FIG. 3 depicts that the differentials between individual cylinder exhaust temperatures and a mean exhaust temperature of the dual fuel mode balanced differentially are approximately the same as those of the unbalanced single fuel mode. In contrast, the unbalanced dual fuel mode shows large differentials between individual cylinder exhaust temperatures and the mean exhaust temperature. The differentials of the unbalanced dual fuel mode are also very different from the unbalanced single fuel operation. FIG. 3 also depicts a single fuel mode balanced such that each operating temperature is the same.

FIG. 4 depicts the power of each cylinder. The dual fuel mode balanced using differentials produces consistent and uniform power compared to other methods. In other words, the power of each cylinder has a low differential from the mean. In contrast, the unbalanced duel fuel mode has very large differentials in power from the mean. Further, the dual fuel mode balanced such that all exhaust temperatures are equal shows a larger imbalance in the power among the cylinders, as shown in FIG. 4 because it does not accurately account for cylinder-to-cylinder variation of the exhaust temperature measurement technique.

Uniform power output from each cylinder can lead to greater balancing of the engine. Greater balancing of the engine may result in lower force applied to engine components, increased longevity, and decreased wear. As can be seen in FIG. 4 balancing an engine such that differentials between individual cylinder exhaust temperatures and a mean are approximately the same between two different operating modes can result in greater uniformity of cylinder power. The embodiment of FIG. 4 depicts balancing an engine such that differentials between individual cylinder exhaust temperatures and a mean are approximately the same between a duel fuel mode and a single fuel mode resulting in greater uniformity of cylinder power.

Figure 5:
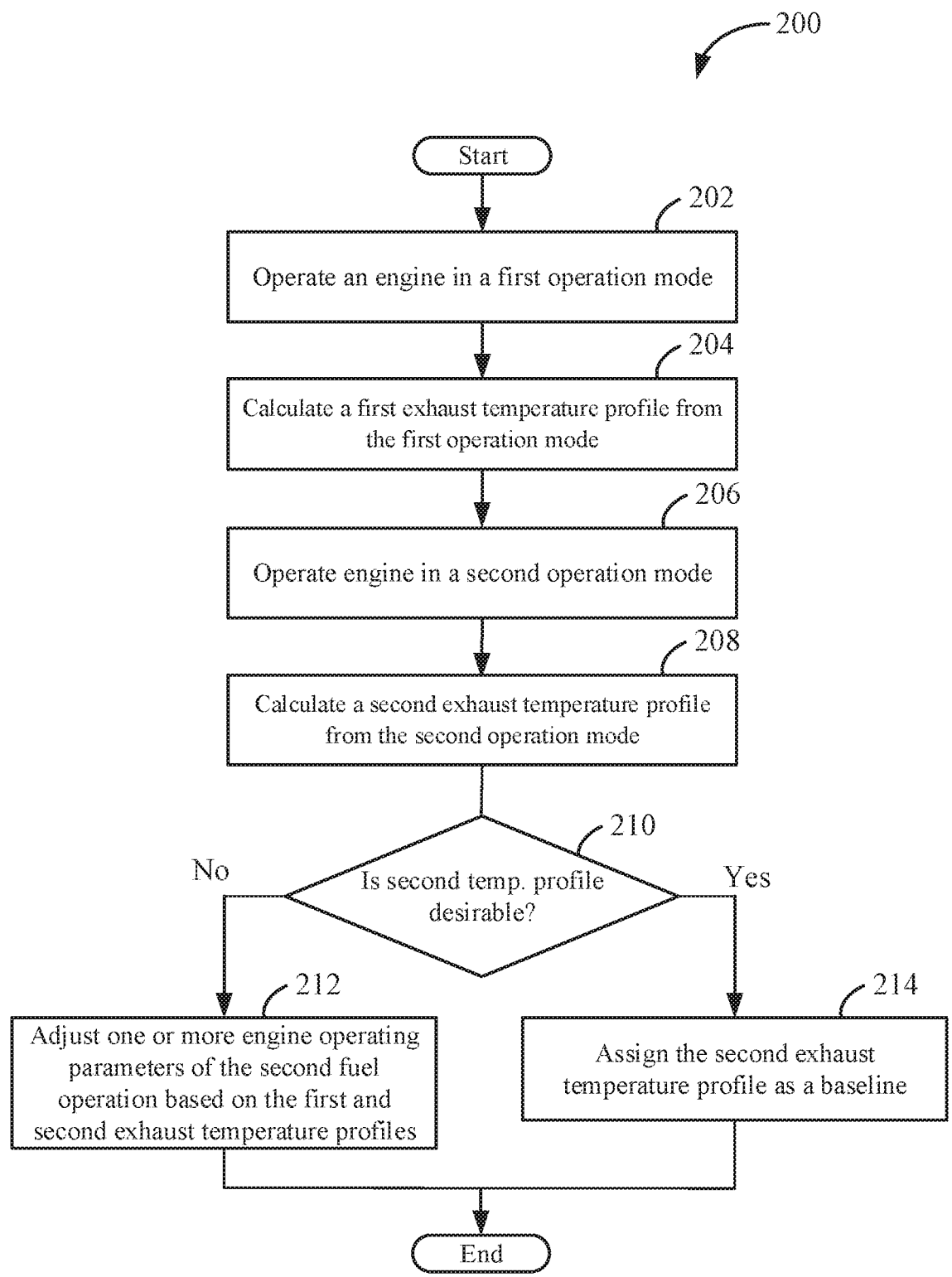
FIG. 5 is a flowchart depicting a method of adjusting operation of an internal combustion engine, according to another embodiment of the present application.

Referring to FIG. 5, a flowchart of another method of operating an engine is depicted. As shown, this method 200, which could also apply to a single fuel engine, comprises injecting a fuel into a plurality of cylinders of the internal combustion in a first operation mode at 202. At 204, the method 200 continues with calculating a first exhaust temperature profile, during the first operation. At 206, the method 200 injects the fuel into the cylinders of the engine in a second operation mode. The method 200 then, at 208, calculates a second exhaust temperature profile during the second operation mode. At 210, it is determined if the second exhaust temperature profile is desirable. This decision may be based on many factors. In one embodiment this decision is based on the output of knock sensors. In another embodiment the decision is based the uniformity of power between individual cylinders, as shown in FIG. 4.

If the second temperature profile is determined to be undesirable, step 212 adjusts one or more engine operating parameters based on the first and second exhaust temperature profiles. In one example, fuel quantity may be adjusted such that the second exhaust temperature profile has approximately the same differentials between individual cylinder exhaust temperatures and a mean as in a first exhaust temperature profile.

If the second temperature profile is determined to be desirable, step 214 assigns the second temperature profile as a new baseline temperature profile. The baseline temperature profile may then be used to determine if future temperature profiles are desirable and to adjust engine operating parameters of future engine operations.

The beginning of method 200, obtaining the first exhaust temperature profile 204, and/or second exhaust temperature profile 208 may be after an event. For example, the event could be one of a maintenance event, a diagnostic event, failure of an exhaust sensor, failure of other sensors, and a factory calibration. In an embodiment, the factory calibration or maintenance event could be performed using additional measurement and/or diagnostic equipment that is not integrated into the engine itself. In an embodiment, the diagnostic event could include conducting an event where the engine is run in a condition that is known, for that particular engine, to have relatively low variation between cylinder power and/or exhaust temperature (e.g., single fuel engines often have lower cylinder variations when run at full power). In an embodiment, the newly obtained second exhaust temperature profile may actually supplant the baseline exhaust temperature profile as a 'new' baseline exhaust temperature profile. Some examples of the type of events that might serve in this capacity could be fuel injector replacement, exhaust temperature sensor(s) replacement, engine overall, and the like.

While the embodiments illustrated and described herein may be used with a multi-cylinder internal combustion engine 10 as that depicted in FIG. 1, other configurations may be used. For example, other quantities of cylinders and/or configurations of cylinder banks can be used. Similarly, other fuel configurations other than dual fuel (engines running on single fuels including, for example, diesel, gasoline, or natural gas) can be used.

Therefore, according to one embodiment of the present application, a method of adjusting operation of an internal combustion engine, the method comprises: injecting a first fuel into a plurality of cylinders of the internal combustion engine, thereby defining a first fuel operation; obtaining a first fuel exhaust temperature profile, during the first fuel operation; injecting a second fuel and the first fuel into the plurality of cylinders of the internal combustion engine, thereby defining a duel fuel operation; obtaining a duel fuel exhaust temperature profile, during the duel fuel operation;

and adjusting one of an injection quantity and an injection timing of one of the first fuel and the second fuel in at least one of the plurality of cylinders, based on a difference between the first fuel exhaust temperature profile and the duel fuel exhaust temperature profile.

In accordance with another embodiment of the application, a method of adjusting operating an internal combustion engine comprises: injecting a fuel into a plurality of cylinders of an internal combustion engine, defining a baseline operation; obtaining a baseline exhaust temperature profile, during the baseline operation; injecting the fuel into the plurality of cylinders; obtaining a second exhaust temperature profile; and adjusting one of an injection quantity and a spark timing of the fuel in at least one of the plurality of cylinders, based on a difference between the baseline exhaust temperature profile and the second exhaust temperature profile.

In accordance with another aspect of the application, a method of adjusting operation of an internal combustion engine, the method comprises: injecting a first fuel into a plurality of cylinders of the internal combustion engine, thereby defining a first fuel operation; obtaining a first fuel engine operating profile, during the first fuel operation; injecting a second fuel and the first fuel into the plurality of cylinders of the internal combustion engine, thereby defining a duel fuel operation; obtaining a duel fuel engine operating profile, during the duel fuel operation; and adjusting one of an injection quantity and an injection timing of one of the first fuel and the second fuel in at least one of the plurality of cylinders, based on a difference between the first fuel engine operating profile and the duel fuel engine operating profile.

In accordance with another aspect of the application, a method of operating an internal combustion engine comprises: injecting a fuel into a plurality of cylinders of an internal combustion engine, defining a baseline operation; obtaining a baseline engine operating profile, during the baseline operation; injecting the fuel into the plurality of cylinders defining an operating condition other than the baseline operating condition; obtaining a second engine operating profile; and adjusting one of an injection quantity and a spark timing of the fuel in at least one of the plurality of cylinders, based on a difference between the baseline engine operating profile and the second engine operating profile.

The present application has been described in terms of the preferred embodiment, and it is recognized that equivalents, alternatives, and modifications, aside from those expressly stated, are possible and within the scope of the appending claims.

FIG. 1 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus ten percent of the value or range unless otherwise specified. For example, embodiments of the application describe two differentials being approximately the same. As used herein, a differential being approximately the same as another differential would be within ten percent greater or less than the value of the other differential.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of adjusting operation of an internal combustion engine, the method comprising:
    injecting a first fuel into a plurality of cylinders of the internal combustion engine in a first fuel operation;
    calculating a first exhaust temperature profile in response to detecting at least one faulty exhaust temperature sensor, the first exhaust temperature profile including first individual exhaust temperatures and a first mean exhaust temperature based on the first fuel operation;
    injecting a second fuel and the first fuel into the plurality of cylinders of the internal combustion engine in a dual fuel operation;
    calculating a dual fuel exhaust temperature profile including second individual exhaust temperatures and a second mean exhaust temperature based on the dual fuel operation; and
    adjusting at least one engine operating parameter in the dual fuel operation such that differences between the first individual cylinder exhaust temperatures and the first mean exhaust temperature are approximately the same as differences between the second individual cylinder exhaust temperatures and the second mean exhaust temperature.

2. The method of claim 1, wherein the first fuel comprises diesel.

3. The method of claim 1, wherein calculating the first fuel exhaust temperature profile comprises collecting an exhaust temperature from each of the plurality of cylinders.

4. The method of claim 1, wherein calculating the dual fuel exhaust temperature profile, comprises collecting an exhaust temperature from each of the plurality of cylinders.

5. The method of claim 1, wherein calculating the first fuel exhaust temperature profile, comprises collecting an exhaust temperature from more than one but less than all of the plurality of cylinders.

6. The method of claim 1, wherein calculating the dual fuel exhaust temperature profile, comprises collecting an exhaust temperature from more than one but less than all of the plurality of cylinders.

7. The method of claim 1, wherein the second fuel comprises natural gas.

8. The method of claim 6, wherein calculating the dual fuel exhaust temperature profile is in response to detecting at least one faulty exhaust temperature sensor.

9. The method of claim 1, further comprising:
obtaining a first fuel engine operating profile other than the exhaust temperature profile, during the first fuel operation;
obtaining a dual fuel engine operating profile other than the exhaust temperature profile, during the dual fuel operation; and
adjusting is further based on a difference between the first fuel engine operating profile and the dual fuel engine operating profile.

10. The method of claim 9, wherein the obtaining a first fuel engine operating profile and the dual fuel engine operating profile is by at least one of: a knock sensor, a pressure sensor, and a stress/strain gage.

11. A method of operating an internal combustion engine comprising:
injecting a fuel into a plurality of cylinders of an internal combustion engine during a first operation mode;
obtaining a first exhaust temperature profile during the first operation mode;
during a second operation mode, injecting the fuel into the plurality of cylinders under an operating condition other than the first operating condition;
obtaining a second exhaust temperature profile during the second operation mode in response to detecting at least one faulty exhaust temperature sensor; and
adjusting one of an injection quantity and a spark timing in at least one of the plurality of cylinders such that differences between individual exhaust temperatures and a mean exhaust temperature are approximately the same when operating in each of the first operation mode and the second operation mode.

12. The method of claim 11, obtaining a third exhaust temperature profile after an event.

13. The method of claim 12, wherein the event comprises one of: a maintenance event, a diagnostic event, and a factory calibration.

14. The method of claim 13, further comprising replacing a baseline exhaust temperature profile with the second exhaust temperature profile.

15. The method of claim 11, further comprising:
obtaining a baseline engine operating profile other than an existing exhaust temperature profile, during a baseline operation;
obtaining a second engine operating profile other than an existing exhaust temperature profile after an event; and
the adjusting is further based on a difference between the baseline engine operating profile and the second engine operating profile.

16. A method of adjusting operation of an internal combustion engine, the method comprising:
injecting a first fuel into a plurality of cylinders of the internal combustion engine in single fuel operation;
obtaining a first fuel engine operating profile and first exhaust temperature profile during the single fuel operation;
injecting a second fuel and the first fuel into the plurality of cylinders of the internal combustion engine in a dual fuel operation;
obtaining a dual fuel engine operating profile and second exhaust temperature profile during the dual fuel operation; and
adjusting one of an injection quantity and an injection timing of one of a first fuel and a second fuel in at least one of the plurality of cylinders such that differences between individual cylinder temperatures and a mean cylinder temperature during single fuel operation are approximately the same as differences between individual cylinder temperatures and a mean cylinder temperature during dual fuel operation,
wherein obtaining the first fuel exhaust temperature profile or the second exhaust temperature profile is in response to detecting at least one faulty exhaust temperature sensor.

17. The method of claim 16, further comprising obtaining a third exhaust temperature profile after an event.

18. The method of claim 16, further comprising obtaining a third exhaust temperature profile after one of: a maintenance event, a diagnostic event, and a factory calibration.

19. The method of claim 16, further comprising replacing a baseline exhaust temperature profile with the second exhaust temperature profile.

20. The method of claim 16, wherein obtaining the second exhaust temperature profile comprises collecting an exhaust temperature from more than one but less than all of the plurality of cylinders.

* * * * *